United States Patent [19]

Ticks

[11] Patent Number: 4,971,300
[45] Date of Patent: Nov. 20, 1990

[54] MOTOR MOUNT HAVING IMPROVED HYDRAULIC DAMPING

[75] Inventor: Gerd-Heinz Ticks, Waldmichelbach, Fed. Rep. of Germany

[73] Assignee: Firma Carl Freudenberg, Weinheim/Bergstr., Fed. Rep. of Germany

[21] Appl. No.: 290,839

[22] Filed: Dec. 27, 1988

Related U.S. Application Data

[63] Continuation of Ser. No. 19,030, Feb. 26, 1987, abandoned.

[30] Foreign Application Priority Data

May 4, 1986 [DE] Fed. Rep. of Germany ....... 3611529

[51] Int. Cl.⁵ ...................... F16F 15/04; B60G 13/00
[52] U.S. Cl. .................................. 267/140.1; 267/219
[58] Field of Search ............... 248/562, 636; 188/298; 180/300, 312; 267/140.1, 35, 140.4, 219, 113, 136

[56] References Cited

U.S. PATENT DOCUMENTS

| 4,422,779 | 12/1983 | Hamaekers et al. | 267/140.1 X |
| 4,630,808 | 12/1986 | Ushijima et al. | 267/219 X |
| 4,708,329 | 11/1987 | Tabata et al. | 267/140.1 |

FOREIGN PATENT DOCUMENTS

| 147242 | 7/1985 | European Pat. Off. | |
| 2727244 | 1/1978 | Fed. Rep. of Germany | 267/35 |
| 1150957 | 1/1958 | France | 267/35 |
| 2327450 | 10/1977 | France | 267/35 |
| 0155029 | 8/1985 | Japan | 267/140.1 |
| 0188637 | 9/1985 | Japan | 267/140.1 |
| 2000253 | 1/1979 | United Kingdom | 267/35 |

*Primary Examiner*—Robert J. Oberleitner
*Attorney, Agent, or Firm*—Kenyon & Kenyon

[57] ABSTRACT

A motor mount having hydraulic damping comprises a support member and a support bearing or wall which are connected by an elastic support spring of circular ring shape and together define an operating space. The operating space is separated from a compensating space by a partition wall connected to the support bearing or wall. The operating space and the compensating space are connected by a connecting aperture or conduit. The conduit penetrates the partition wall and is interrupted by at least one cavity of variable volume. The part sections of the conduit formed thereby have a cross-section reduced stepwise in the direction from the operating space to the compensating space. This gives the motor bearing a wide-band damping effect.

7 Claims, 3 Drawing Sheets

MOTOR MOUNT HAVING IMPROVED HYDRAULIC DAMPING

This application is a continuation of application Ser. No. 019,030, filed Feb. 26, 1987, now abandoned.

FIELD OF THE INVENTION

This invention relates to hydraulically damped motor mounts. More particularly, this invention relates to a motor mount with hydraulic damping, comprising a support member and a support bearing wall which are connected by a support spring having a circular ring shape and together defining an operating space. The operating space is separated from a compensating space by a partition wall. A connecting aperture or conduit is provided between the operating space and the compensating space. The connecting aperture or conduit is divided by at least one cavity of variable volume into part sections having cross-sections reduced stepwise in the direction from the operating space to the compensating space in order to achieve a good damping effect in different frequency ranges when the fluid contained in the connecting conduit is subjected to vibrations.

BACKGROUND OF THE INVENTION

A motor bearing of the general type described above is disclosed in European Patent Application No. 0 147 242. In this reference, the aperture connecting the operating and compensation spaces is designed as a canal of such dimensions that when vibrations having a frequency from 5 to 20 Hz are introduced, a viscosity damping results in the part section of the canal ending in the compensation space, and when vibrations of a frequency over 20 Hz are introduced, a resonance damping results in the part section of the canal ending in the operating space. Thus, the high-frequency vibrations also experience a damping effect. Both high and low-frequency vibrations are damped effectively only within the range of a relatively narrow frequency band of narrow width. But both frequency bands are separated from each other by a great distance in which there is no appropriate damping effect. The damping effects are determined in their frequency position by the cross-section of the respective part section of the connecting aperture or canal.

OBJECTS OF THE INVENTION

It is an object of the present invention to provide a motor bearing which has a good damping effect in a closed, arbitrarily wide frequency band of low-frequency vibrations. Independent thereof, the motor bearing of the present invention is to have a negligibly small damping effect when high-frequency vibrations are introduced and thus assure an excellent isolation of such high-frequency vibrations.

SUMMARY OF THE INVENTION

According to the present invention, a motor bearing of the type described at the outset is provided having cross-sections of consecutive part sections of the connecting aperture or conduit that are varied so little relative to each other that the frequency ranges of a good damping effect blend into each other. The cross-section of the part section of the connecting conduit ending in the compensation space is designed sufficiently narrow that an optimal damping effect results at the lowest frequency of vibrations to be damped. The cross-section of the part section of the connecting aperture or conduit ending in the operating space is designed sufficiently large so that an optimal damping effect results at the highest frequency of vibrations to be damped. The volume variability of each cavity and the fluid volume moved back and forth in the part section of the connecting conduit preceding the cavity in the direction toward the operating space are essentially the same upon the attainment of the optimal damping effect.

The motor bearing according to the invention is of cascade-like construction whose function is characterized in that, starting from the lower limit of the frequency range of the introduced vibrations to be damped, the damping effect of the last part section of the connecting aperture or conduit between the operating space and the compensation space is first activated. As the frequency continues to increase, the part sections of the connecting aperture or conduit preceding the last one activated in the direction toward the operating space are activated successively until the upper limit of the frequency range of introduced vibrations to be damped is reached. Within the range of vibrations to be damped, the fading damping power of one part section of the connecting aperture or conduit is thus compensated, at least in part, by the newly starting damping power of the next following part section of the aperture or conduit, resulting in an almost unnoticeable transition, if the gradation of the successive diameters of the part sections of the connecting aperture or conduit is fine.

The reason why the damping power of each part section of the connecting aperture or conduit fades as the frequency of introduced vibrations increases is that the fluid volume moved back and forth within it becomes smaller and smaller for reasons explainable by the laws of physics. It can be said, therefore, that the general rule that applies to each of these part sections is that above a specifically associated frequency limit, both the fluid volume moved back and forth and the damping effect dependent thereon are negligible. This is thus the equivalent to a blockage of the transmissibility of fluid in the respective part section of the connecting aperture or conduit above this specifically associated frequency limit of introduced vibrations.

For the absorption of the fluid volume moved back and forth in each part section of the connecting aperture or conduit preceding in the direction of the operating space it is, therefore, provided in the motor bearing according to the present invention that volume in the cavity in between is made variable. This enables this cavity to absorb the fluid volume moving back and forth in the part section and pulsating in alternating directions in the mouth without affecting in this respect the simultaneously effective blockage of the transmissibility of fluid in the succeeding part section. Therefore, the effects based on the laws of physics do not counteract, in the motor bearing according to the invention, the attainment of an optimal damping effect in each one of the part sections of the connecting aperture or conduit. The difference between the maximum and minimum volumes of each cavity and the fluid volume moved back and forth in the connecting aperture or conduit part section preceding such cavity in the direction toward the operating space should be essentially the same.

While a positive maximum cavity volume still results in an optimal damping action with respect to the part section in the direction toward the operating space, this leads to an impairment of the achievable damping power in the next part section in the direction toward the compensating space.

On the other hand, a negative maximum cavity volume has a disadvantageous effect on the damping power of the part section preceding the cavity of variable volume in the direction toward the operating space.

Consequently, an optimal damping effect is not achievable in either case in at least one connecting aperture or conduit part section in the presence of such a difference. Therefore, the present invention aspires to achieve coincidence to the greatest possible extent.

The connecting aperture or conduit may be designed as throttle opening in at least one part section. The damping effect thus obtained is not particularly great in its amplitude, but it is effective over a comparatively wide frequency spectrum. If the gradation of the diameters of successive connecting aperture or conduit part sections is coarse, a wide spectrum of vibrations to be damped can be covered by only a few part sections, which is of advantage for a simple motor bearing design. The damping powers of consecutive connecting aperture or conduit part sections can blend into each other so as to be hardly noticeable.

According to another embodiment of the present invention, the connecting aperture or conduit is designed in at least one of the part sections to resemble a canal of such dimensions that the fluid mass enclosed by the connecting aperture or conduit can be caused to vibrate in a resonant vibration by the bulging elasticity of the support springs upon the introduction into the motor bearing of the vibrations to be damped. The damping effect is considerable. It permits a particularly small motor bearing design.

At least one cavity may be equipped with a movable compensation wall to vary its volume. Supporting means to limit the mobility of the compensation wall are provided. The compensation wall may be disposed between the cavity and the directly adjacent, fluid-filled space in the direction toward the compensation space and be designed as partitioning wall between both spaces. In addition to weight savings, the resultant design is reminiscent of a cascade which, in addition to small size, results in particularly great ruggedness.

The compensation wall may comprise a foil deformable within limits and its peripheral area may be fixed to the support bearing inner wall. The use of rubber-elastic materials for the manufacture of the compensation wall has proven excellent because this results in a progressive spring characteristic for the compensation wall which frequently obviates the use of secondary stiffening agents. Fixation of the compensation wall to the support bearing may be by gluing or by embedding a peripheral bead into a suitable recess in the support bearing. In cases where there is a certain clearance between both parts in the peripheral bead area, a particularly low material-specific stress results. This is of advantage with respect to fatigue resistance. Making the compensation wall inherently stiff is also possible. In this case, the compensation wall is movable relative to the support bearing between stops. The stops may be formed by grid walls running parallel to the compensation wall.

The advantages achievable with the motor bearing according to the present invention are in particular that it has a good damping effect in a frequency range of a freely selectable determinable width and this damping effect is no longer apparent outside this selected frequency range. Therefore, the hydraulically damped motor bearing of the present invention is excellently suited for use in motor vehicles.

BRIEF DESCRIPTION OF THE DRAWINGS

Examples of the motor mount according to the present invention are illustrated in longitudinal section in the annexed drawings.

DETAILED DESCRIPTION

Figure 1:
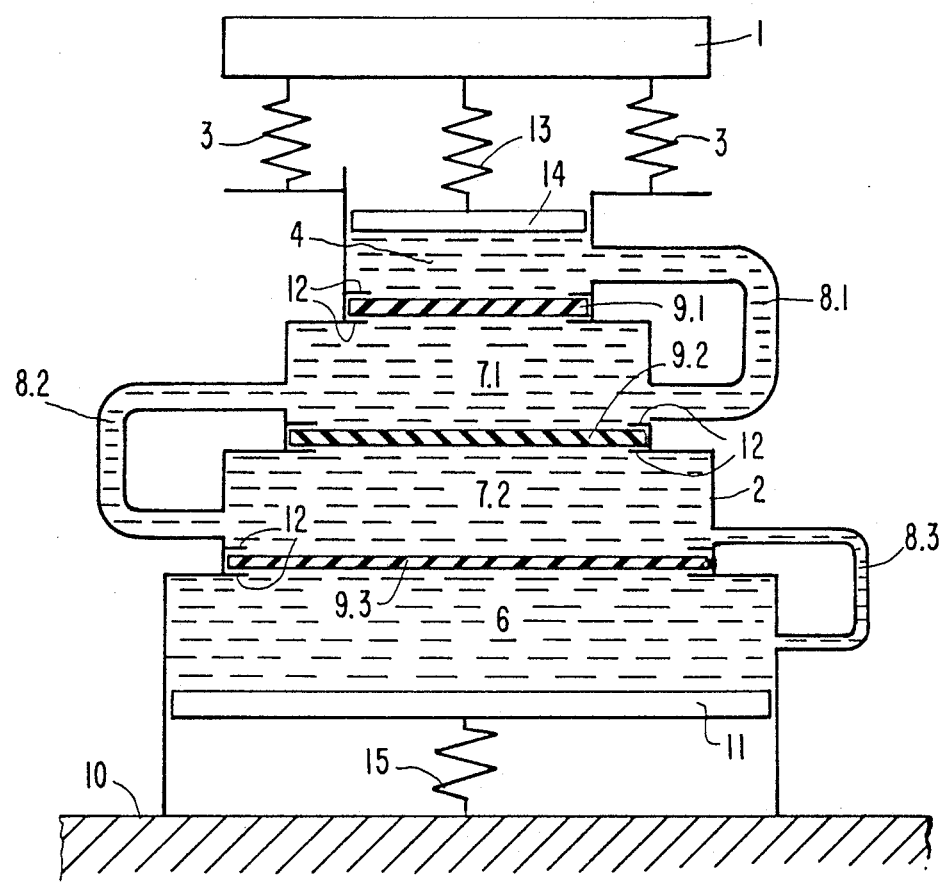
FIG. 1 is schematic of one embodiment of the motor mount in accordance with the present invention having a cascade-like design.
Figure 1A:
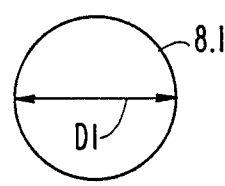
FIGS. 1a, 1b and 1c respectively schematically illustrate conduit 8.1 having diameter D1, conduit 8.2 having diameter D2, conduit 8.3 having diameter D3 wherein D3 is less than D2, which is less than D1 whereby the cross-sections of the conduit means in the direction from the operating space 4 to the compensation space 6 are respectively reduced.
Figure 1B:
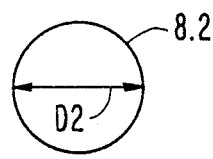
Figure 1C:
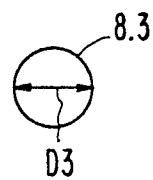

FIG. 1 shows a schematic of a motor mount in accordance with the present invention having two cavities 7.1 and 7.2 disposed between an operating space 4 and a compensation space 6.

The support member 1 is connected to the support bearing or wall 2 via the two support springs 3 with the support bearing 2 being supported by the base plate 10.

The support member 1 is further connected via a coupling spring 13 to displacement piston 14 which forms the upper limit of the operating space 4. The operating space 4 communicates via connecting line or conduit 8.1 with the cavity 7.1 which, in turn, communicates via a connecting line or conduit 8.2 into the cavity 7.2. Cavity 7.2 is similarly connected in fluid communication with the compensation space 6 via a third connecting line or conduit 8.3. The bottom of the compensation space 6 is closed off by a terminal piston 11 which is suspended elastically (15). The partitioning walls 9.1, 9.2, 9.3 disposed between the various spaces 4, 7.1, 7.2, and 6 are designed as compensation walls, i.e., they can move axially between the limiting stops 12 and contribute to a volume variation of the various fluid spaces. The cross-sections (e.g., inside diameters) and lengths of the various connecting apertures or conduits 8 are so selected from top to bottom that the fluid column of the lower connecting aperture or conduit 8.3 is in resonance at the lowest selected frequency to be damped while the fluid column of the upper connecting aperture or conduit 8.1 vibrates in resonance at the highest selected frequency to be damped.

In practice this means that, at low frequencies, the amount of fluid displaced from the operating space flows nearly without losses and without phase shift through the connecting line 8.1, the cavity 7.1, and the second connecting line 8.2 into the cavity 7.2. It is only when flowing through the line 8.3 into the compensating space 6 that the losses occur generated due to the resonant vibration. With increasing excitation frequency the loss-inducing resonance vibration moves further and further into the upper part of the bearing, that is from line 8.3 to line 8.2 until it finally occurs only in the connecting line 8.1. It is possible due to the axial mobility of the various compensation walls 9 to adjust the resonant vibrations of the various connecting walls 9 and to adjust the resonant vibrations of the various connecting apertures or conduits 8.1, 8.2 and 8.3 so that they occur as a function of amplitude.

Thus, the damping achievable with the bearing of the present invention can be adjusted not only as a function of frequency, but also as a function of amplitude.

Figure 2:
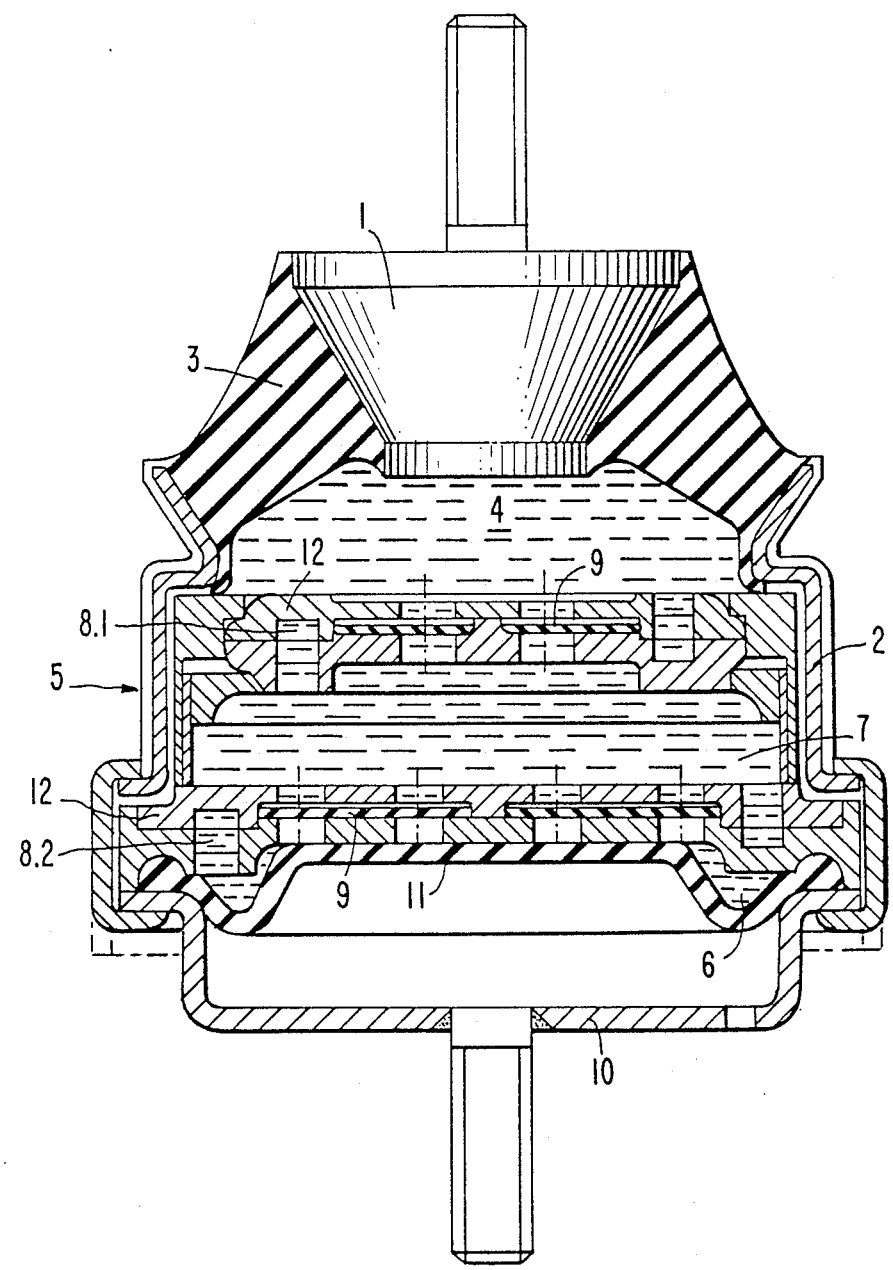
FIG. 2 is a schematic structural design of another embodiment of the motor mount in accordance with the present invention having an operating space, one cavity and a compensating space.

FIG. 2 illustrates a structural design of a motor mount in accordance with the present invention having an operating space 4, a cavity 7 and a compensation space 6. The support member 1 is connected to the support bearing or wall 2 by a support spring 3 of annular shape. The support spring 3 is suitably fabricated from rubber and can be fixed to both parts by vulcanization.

The support bearing 2 is of multiple part design and its underside is defined by the bottom plate 10. The support member 1 and the bottom plate 10 are provided with a threaded stud, making it possible to screw it to the chassis adjacent to one side and to the motor adjacent on the other side of the motor bearing. Suitably, the support member 1 is secured to the motor.

The interior of the motor bearing is divided by the partitioning walls 5 into the operating space 4 and the compensation space 6. In the illustrated embodiment, the bottom of the compensation space 6 is closed off by a flexible bellows 11 whose central portion rests against the underside of the partitioning wall 5 in the no-load state of the motor bearing as shown. The bellows 11 is fabricated from a soft-elastic rubber. Therefore, the bellows 11 is in a position to absorb the fluid volume displaced from the operating space 4 when the support member 1 becomes stressed. The spring elasticity of the design illustrated in FIG. 2 is determined essentially by the spring elasticity of the support spring 3. Functionally, this design should be classified as single chamber bearing.

The present invention is also applicable to dual chamber bearings having a substantial spring action regarding the bulging elasticity of the support spring 3. Functionally, the bulging elasticity of the support spring 3 corresponds to the elasticity of the coupling spring 13 of FIG. 1. In dual chamber bearings, the compensation space 6 is closed off at the underside by a spring-elastic wall instead of a soft elastic bellows. This always causes a pressure to build up inside under a predetermined load, which is of advantage for certain applications.

In the embodiment illustrated in FIG. 2, the partitioning walls 5 are disposed between the operating space 4 and the compensation space 6. They enclose the centrally disposed cavity 7 which is variable in its volume and which communicates with the operating space 4 through the part section 8.1 of the connecting aperture or conduit and with the compensation space 6 through the part section 8.2 of the connecting aperture or conduit 8. The operating space 4, the cavity 7 and the compensating space 6 are suitably filled with a glycol and water mixture. They communicate with each other through the part sections 8.1 and 8.2 of the connecting aperture or conduit.

The cavity 7 is defined by paired grid plates 12 relative to the operating space 4 on the one hand and to the compensation space 6 on the other. The grid plates 12 in the embodiment of FIG. 2 each enclose a plane rubber platelet of annular shape which is movable perpendicular to its extent within the given clearance between the grid plates 12. Compensation walls 9 are thus formed in this manner.

The grid plates 12 are each penetrated in their outer peripheral area by the part sections 8.1, 8.2 of the connecting conduit between the operating space 4 and the compensation space 6. The part sections 8.1 and 8.2 have a winding path. Consequently, their length is considerably greater than their associated diameter.

The motor bearing of the present invention illustrated in FIG. 2 functions as follows. If high frequency engine vibrations are introduced into the support member 1 of the motor bearing of FIG. 2, the relative displacement of the support member 1 is of small amplitude only. The resultant volume variations in the operating space 4 can be compensated by swelling motions of the support spring 3 and by a supplemental back and forth motion of the compensating walls between their stops while avoiding a fluid exchange between the operating space 4, the cavity 7 and the compensation space 6. Due to this, the motor bearing of FIG. 2 has almost no damping effect with respect to the introduction of high frequency vibrations, but has an excellent isolation effect.

Traversing a very rough uneven road at extremely low speed, for example, leads to large relative displacements of the support member 1 and, consequently, to extremely great variations of the volume of the operating space 4. These volume variations can no longer be compensated in the above described manner, but rather, an extremely pronounced fluid exchange between the operating space 4, the cavity 7 and the compensating space 6 results. In accordance with the present invention, the cross-section and the length of the connecting conduit part section 8.2 of the operating space 4 and the compensating space 6 is selected so that the fluid mass obtained, ultimately supported elastically by the support spring 3 which can swell laterally, starts to vibrate in resonant vibration at a frequency characterizing the given operating situation. This causes an optimal damping effect to be exerted on the excitation vibration.

If the frequency of the exciting vibration increases slightly, e.g. due to a slightly higher travel speed, the back and forth movement of the fluid component in the connecting conduit part section 8.2 slowly comes to a stop, resulting in a reduction of the damping effect caused thereby. This abatement of the damping effect, caused first of all by the connecting conduit part section 8.2, is compensated in the motor bearing according to the invention by the damping power of the connecting conduit part section 8.1 which now sets in and is increasing in the sense of the above explanations. It is also based on the utilization of the extinction effect, an optimal effectiveness resulting also in the range of a closely defined frequency. However, the fluid volume moved back and forth in this case within the part section 8.1 is no longer transferred into the compensation space 6, but only into the cavity 7 whose volume is variable due to the compensation wall 9 which is directly adjacent to the compensation space 6 and is movable back and forth between stops. The compensation wall directly adjacent to the operating space is of similar design. But the front side of the compensation wall adjacent the operating space is acted upon by the pressure in the operating space 4 and, therefore, can not be taken into account when determining the extent to which the cavity 7 is variable in its volume. Despite the increasing frequency of the vibrations introduced, therefore, the damping effect continues to be optimal.

Critical vibrations requiring damping occur in regular motor vehicle engines usually only in the range between 5 and 20 Hz. This range can be damped perfectly with the embodiment shown, in which the connecting aperture is divided into part sections by one cavity only. In other cases, in which the range of vibrations to be damped is even wider, a modified embodiment may be recommendable, in which the connecting aperture is divided in accordance with the above explanations into an even greater number of part sections by several cavities of variable volume disposed one after the other. The isolation effect obtained for frequencies above the selected range is not affected.

Figure 3:
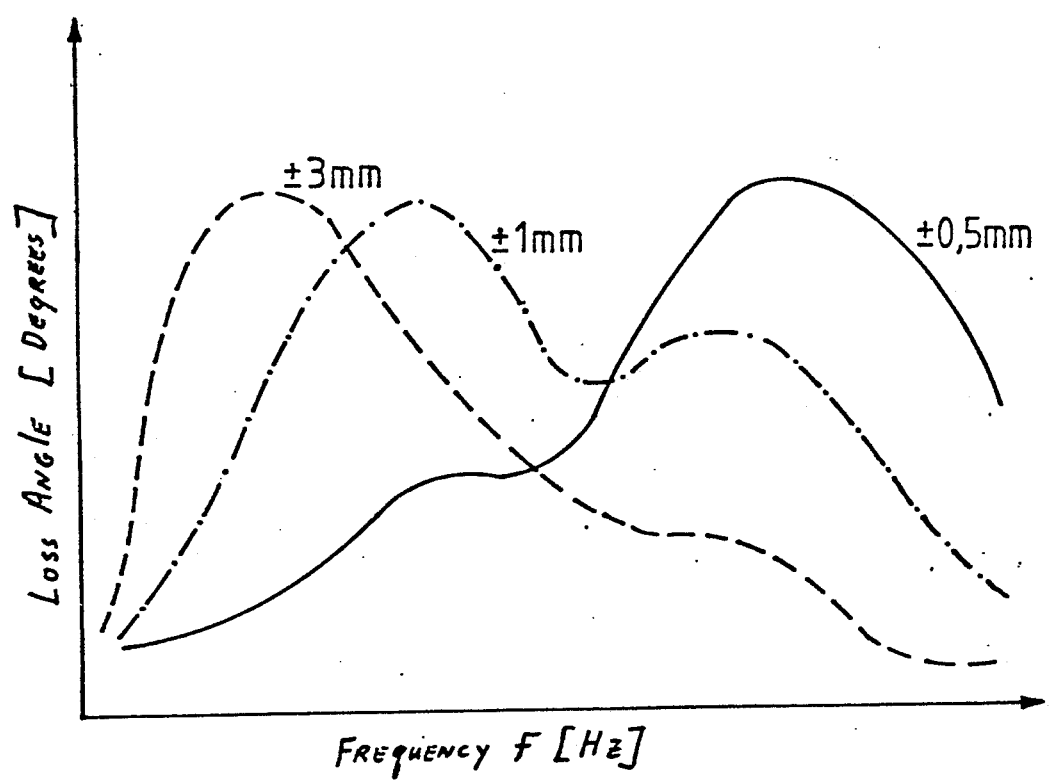
FIG. 3 is a graph showing the loss angle plotted against the frequency at three different excitation amplitudes.

FIG. 3 is a graph showing the loss angle curve with respect to the frequency at different excitation amplitudes. In this case, test results of a bearing according to FIG. 2 are involved.

The high amplitudes (e.g. +3 mm) experience a great attenuation in the lower frequency range, while the lower amplitudes (e.g. +0.5 mm) are damped more at higher frequencies. At a medium amplitude (e.g. +1.0 mm) the two maxima of the loss angle are clearly recognizable.

The motor bearing of the present invention can be adapted optimally to the conditions prevailing for a particular vehicle by varying this frequency and amplitude dependent damping.

Although preferred embodiments of the present invention have been described in detail, it will be understood that modifications may be made by those skilled in the art all within the spirit and the scope of the present invention as defined in the claims.

What is claimed is:

1. A hydraulically damped bearing mount for mounting vibrating equipment and for providing damping at more than one selected frequency comprising:
    a support member and a bearing wall with a support spring joining said support member and said bearing wall, said support member, said bearing wall and said support spring together defining an operating space;
    means for providing a compensation space in association with said operating space;
    means for providing a cavity of variable volume disposed between said operating space and said compensation space;
    a first partition wall disposed between and separating said operating space and said cavity;
    a second partition wall disposed between and separating said compensation space and said cavity;
    first conduit means having an interior cross-section for liquid flow connecting said operating space and said cavity in fluid communication;
    second conduit means having an interior cross-section for liquid flow connecting said compensation space and said cavity in fluid communication;
    with said operating space, said compensation space, said cavity, and said first and second conduit means defining an enclosed volume having hydraulic liquid disposed therein;
    wherein said cross-section of said second conduit means is less than said cross-section of said first conduit means with the cross-section of said second conduit means communicating with said compensation space being dimensioned so small that optimum fluid damping effect results upon introduction of the lowest selected frequency of vibrations to be damped and with the cross-section of said first conduit means communicating with said operating space being dimensioned so large that optimum fluid damping effect results upon introduction of the highest selected frequency of vibrations to be damped;
    wherein the cross-sections of said first and second conduit means vary so little from one another that vibrations, introduced into the bearing mount, having frequencies in a range between the lowest and highest selected frequencies are fluidicly damped; and
    the volume variability of said cavity and the volume of hydraulic liquid moved back and forth in the first conduit means and the volume variability of the compensation space and the volume of hydraulic liquid moved back and forth in the second conduit means are essentially the same upon attainment of optimal fluid damping effect in each respective conduit means.

2. The bearing mount of claim 1 wherein said means for providing a cavity of variable volume comprises means for providing more than one variable volume cavity disposed successively between said operating space and said compensation space with additional conduit means having an interior cross-section for liquid flow connecting each successive cavity in fluid communication wherein the cross-section of each successive conduit mean in the direction from the operating space toward compensation space is less than the cross-section of the preceding conduit means with the cross-sections of each conduit means varying so little from one another that vibrations having frequencies in a range between the lowest and highest selected frequencies are damped and the volume variability of each respective cavity and the volume of hydraulic liquid moved back and forth in the conduit means immediately preceding each respective cavity in the direction toward the operating space are essentially the same upon attainment of optimal damping effect in each respective conduit means.

3. The bearing mount of claim 2 wherein at least one of the conduit means has a length greater than the length of a preceding conduit means in the direction toward the operating space.

4. The bearing mount of claim 2 wherein at least one of the conduit means is in the form of a canal having dimensions such that when vibrations to be damped are introduced into the bearing mount the amount of hydraulic liquid contained in the canal is caused to vibrate in resonant vibration by the bulging elasticity of said support spring.

5. The bearing mount of claim 2 having partition walls disposed between each cavity and means mounting at least one said partition wall to permit limited mobility of said partition wall responsive to introduced vibrations thereby varying the volume of the adjacent cavity.

6. The bearing mount of claim 5 wherein said mounting means includes stops for limiting the mobility of the partition wall and said partition wall is of inherently stiff design.

7. The bearing mount of claim 2 having partition walls disposed between each cavity and at least one partition wall is a foil of limited deformability with said foil fixed at its periphery to said bearing wall.

* * * * *